United States Patent [19]
Ponziani

[11] Patent Number: 5,860,185
[45] Date of Patent: Jan. 19, 1999

[54] REVERSING WIPER MOTOR SYSTEM

[75] Inventor: Richard Louis Ponziani, Centerville, Ohio

[73] Assignee: ITT Automotive Electrical Systems, Inc., Auburn Hills, Mich.

[21] Appl. No.: 702,253

[22] Filed: Aug. 23, 1996

[51] Int. Cl.⁶ .................................................. B60S 1/08
[52] U.S. Cl. .................................. 15/250.13; 15/250.17; 318/443; 318/DIG. 2
[58] Field of Search ..................... 015/250.13, 250.12, 015/250.16, 250.17, 250.3; 318/443, DIG. 2, 444, 256, 483

[56] References Cited

U.S. PATENT DOCUMENTS

| | | | |
|---|---|---|---|
| 4,091,317 | 5/1978 | Roszyk et al. | 318/369 |
| 4,158,159 | 6/1979 | Orris et al. | 318/443 |
| 4,314,186 | 2/1982 | Gille et al. | 318/434 |
| 4,317,073 | 2/1982 | Blaszkowski | 318/483 |
| 4,320,329 | 3/1982 | Gille et al. | 318/443 |
| 4,355,270 | 10/1982 | Cook et al. | 318/443 |
| 4,405,887 | 9/1983 | Tamura et al. | 15/250.12 |
| 4,431,954 | 2/1984 | Carpenter et al. | 318/443 |
| 4,705,998 | 11/1987 | Millerd et al. | 318/444 |
| 4,710,878 | 12/1987 | Iyoda | 364/424 |
| 4,720,664 | 1/1988 | Iwamoto et al. | 318/444 |
| 4,733,142 | 3/1988 | Bicknell | 318/283 |
| 4,851,745 | 7/1989 | Ponziani | 318/443 |
| 4,866,357 | 9/1989 | Miller et al. | 318/443 |
| 4,942,349 | 7/1990 | Millerd et al. | 318/483 |
| 4,947,092 | 8/1990 | Nabha et al. | 318/434 |
| 5,086,260 | 2/1992 | Ito | 318/264 |
| 5,117,168 | 5/1992 | Nomura et al. | 318/444 |
| 5,119,002 | 6/1992 | Kato et al. | 318/444 |
| 5,157,314 | 10/1992 | Kühbauch | 318/443 |
| 5,235,260 | 8/1993 | Furukoshi | 318/443 |
| 5,252,897 | 10/1993 | Porter et al. | 318/DIG. 2 |
| 5,256,950 | 10/1993 | Matsumoto et al. | 318/443 |
| 5,276,388 | 1/1994 | Levers | 318/444 |
| 5,331,257 | 7/1994 | Materne et al. | 318/85 |
| 5,355,061 | 10/1994 | Forhan | 318/443 |
| 5,404,085 | 4/1995 | Resch et al. | 318/443 |
| 5,412,296 | 5/1995 | Chien et al. | 318/444 |

FOREIGN PATENT DOCUMENTS

| | | | |
|---|---|---|---|
| 0545793 | 6/1993 | European Pat. Off. | |
| 212 224 | 8/1984 | Germany | 15/250.17 |
| 3732958 | 9/1987 | Germany | |
| 3730448 | 3/1988 | Germany | 15/250.12 |
| 3730900 | 3/1989 | Germany | 15/250.12 |
| 4039038 | 11/1992 | Germany | |

*Primary Examiner*—Gary K. Graham
*Attorney, Agent, or Firm*—J. Gordon Lewis

[57] ABSTRACT

A windshield wiper system and method comprising a controller which cooperates with a single sensor positioned in fixed relationship to a target situated on an armature of a drive motor which is driven in response to the controller. The wiper motor is a reversing wiper motor and changes direction in response to a change of polarity of drive signal generated by controller. An interrupt is situated on a drive train driven by the armature of the wiper motor and moves in correlation to the movement of a wiper blade. The sensor generates a pulse train associated with the movement of the wiper blade, and this pulse train gets interrupted by the interrupt when the wiper blade reaches a reversing position, such as an inwipe or an outwipe position. The interruption thereby gives controller an indication of when to reverse the polarity of the drive signal used to drive the wiper motor. The controller also uses the polarity of the drive signal to determine direction and, when used in combination with the sensor signal pulse train, to determine the velocity and position of the wiper blade. This, in turn, enables controller to control the velocity and direction of the wiper blades.

8 Claims, 3 Drawing Sheets

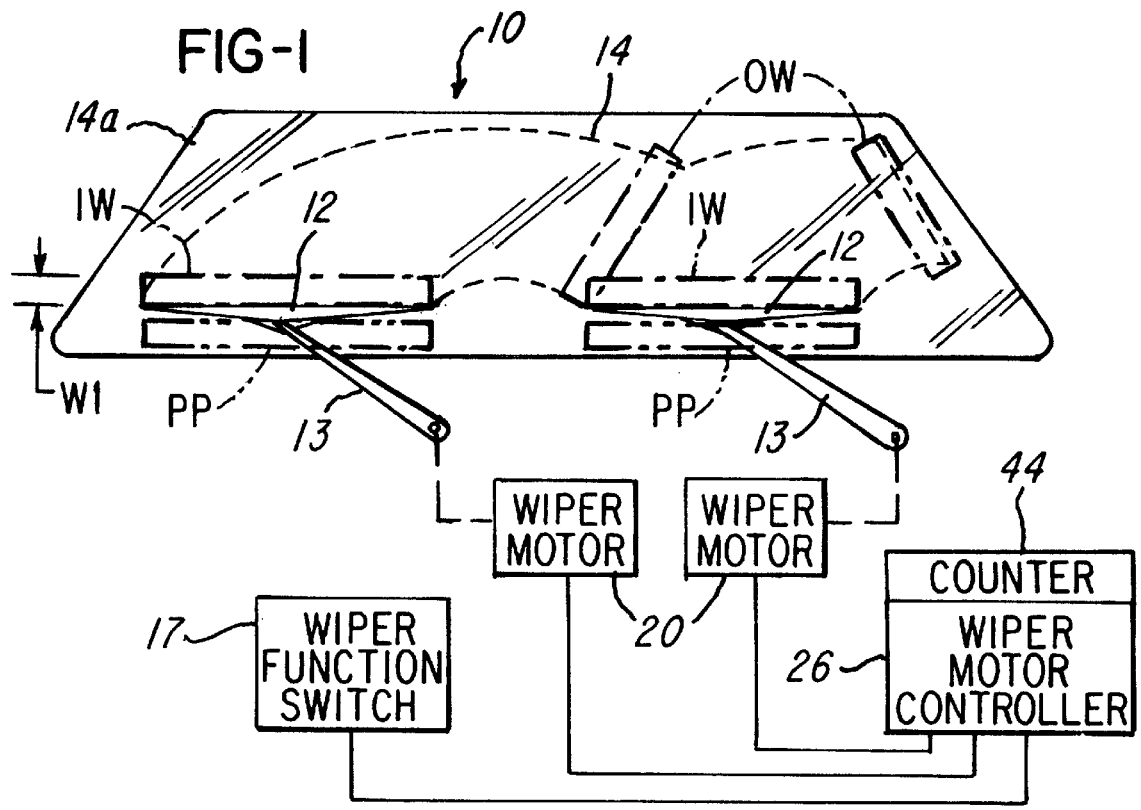
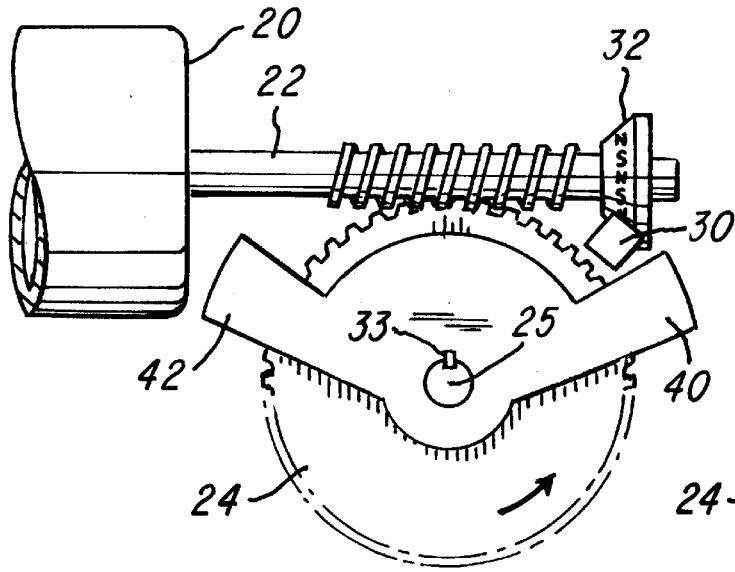
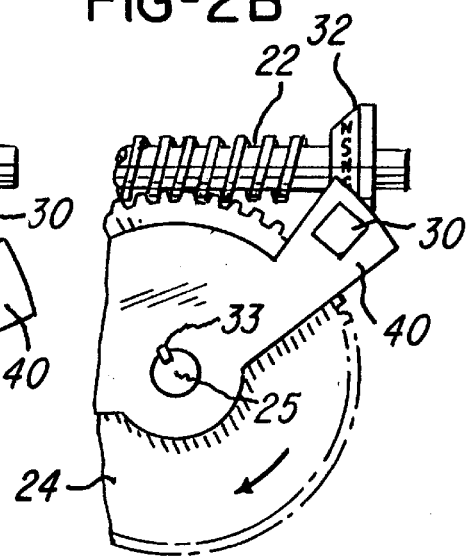

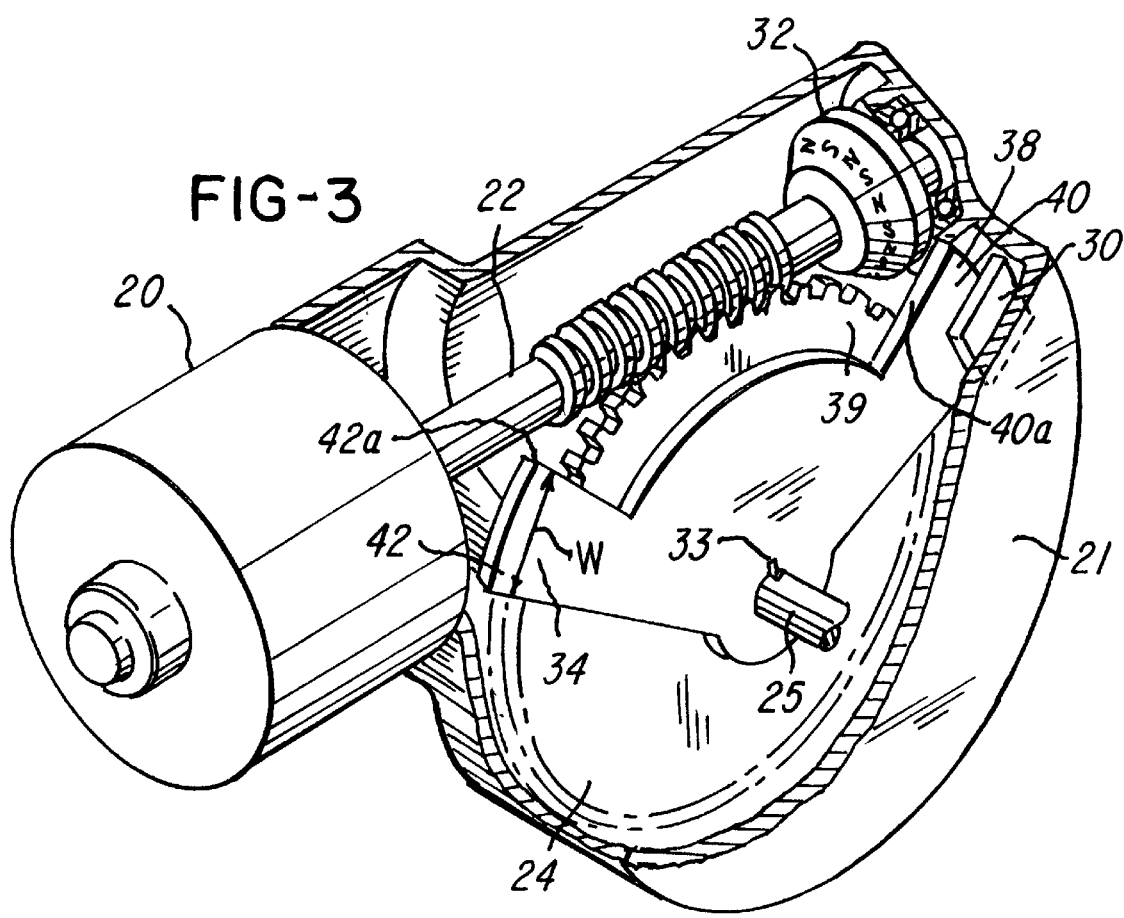

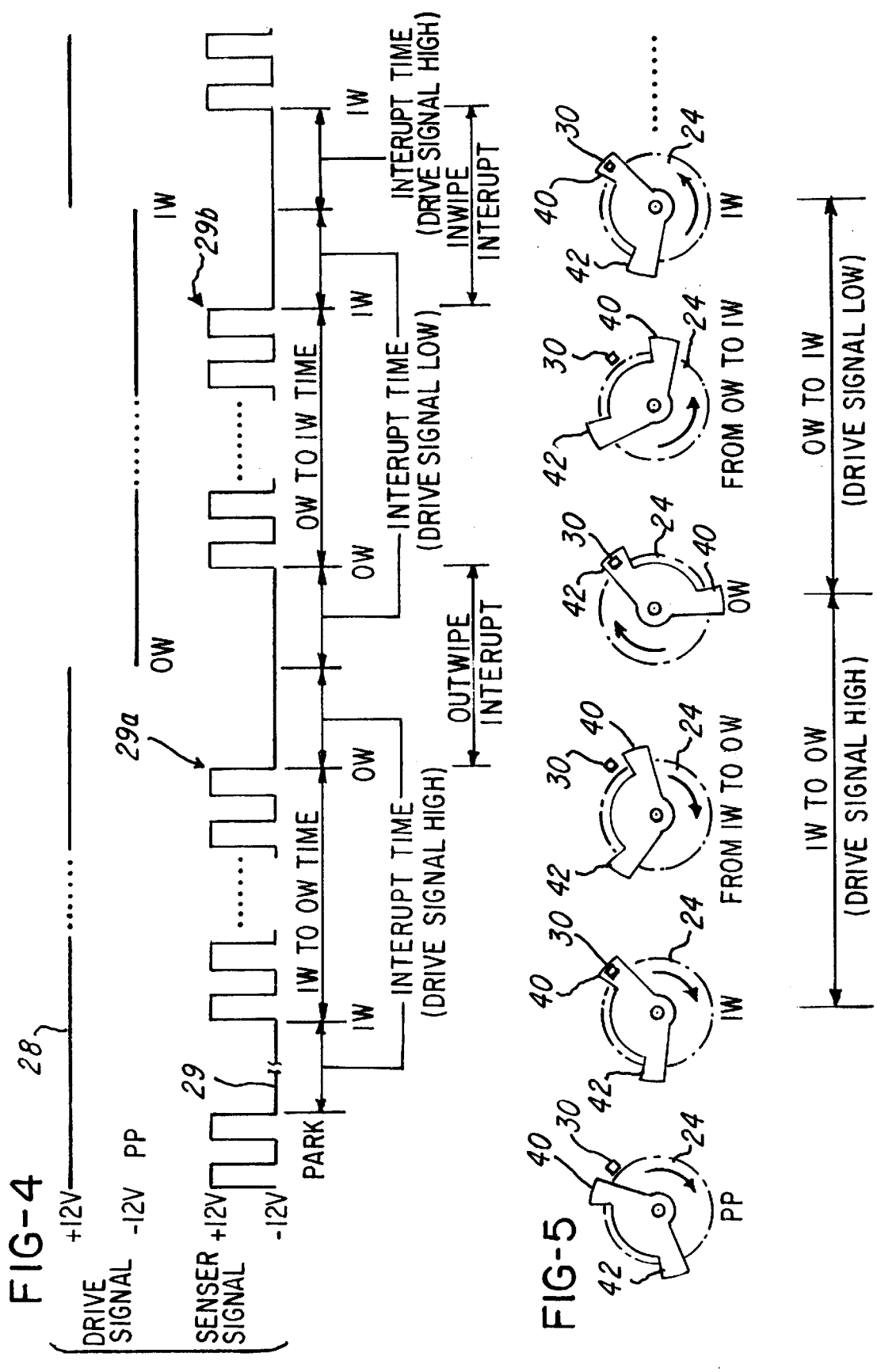

REVERSING WIPER MOTOR SYSTEM

FIELD OF THE INVENTION

This invention relates to a windshield wiper system and method and, more particularly, a method and system for utilizing a single sensor to provide inputs necessary to ascertain direction, velocity and movement of a wiper blade.

BACKGROUND OF THE INVENTION

In the past, many approaches have been utilized to drive wiper blades. One such approach is to use a reversing wiper motor which is coupled directly to a wiper blade arm which moves a wiper blade across a windshield surface.

In a typical reversing wiper motor of the past, control electronics are in need of position feedback in order to be able to energize the wiper motor to reverse directions so that a wiper blade will change directions at the end of a stroke which generally corresponds to an either inwipe position or an outwipe position. Also, real time wiper velocity and position were monitored in order to prevent two overlapping blades from colliding.

Typically, multiple sensor components were needed to provide the wiper blade position direction and velocity.

What is needed, therefore, is a simple system and method which can provide all necessary information required, yet which is simple in design and which utilizes a small number of components, thereby saving costs of manufacture, assembly and the like.

SUMMARY OF THE INVENTION

It is, therefore, a primary object of this invention to provide a wiper system and method for wiping a windshield which utilizes a reversing motor, but which is simple in design and which minimizes the number of components used.

Another object of this invention is to provide a system and method which can utilize, for example, a single sensor and an interrupt which moves relative to the movement of a wiper blade to facilitate providing necessary feedback information required by the control electronics.

In one aspect of the invention, the invention comprises a windshield wiper system comprising: a controller, at least one windshield wiper blade, a reversing wiper motor coupled to the controller, the reversing wiper motor having an armature, a drive train for coupling the reversing wiper motor to at least one windshield wiper blade, a sensor coupled to the controller and associated with the wiper motor armature for generating a position signal indicating a wiper blade direction and a wiper blade position.

In another aspect, the invention comprises a method for wiping a windshield comprising the steps of: driving at least one wiper blade with a reversible drive motor, sensing a position of the wiper blade using a single sensor associated with an armature of the drive shaft and generating a position signal in response thereto, and energizing the reversible drive motor with the position signal to cause at least one wiper blade to reverse directions when at least one wiper blade reaches either the inwipe or outwipe position.

Other objects and advantages of the invention will be apparent from the following description, the accompanying drawings, and the appended claims.

BRIEF DESCRIPTION OF THE DRAWINGS

FIG. 1 is a general schematic view of a system in accordance with one embodiment of the invention;

FIG. 2A is an enlarged view of a wiper motor, wiper motor armature, sensor, target and sensor interrupt mounted on a driven gear which is driven by the armature;

FIG. 2B is a fragmentary view similar to the view shown in FIG. 2A illustrating the interrupt after an inwipe interrupt has been driven between the sensor and the target;

FIG. 4 is an illustration of a drive signal shown in correlation with a sensed position signal generated by the sensor used in the system; and FIG. 5 is an illustration of the cycle during which a wiper blade is driven from a park position to an inwipe position to an outwipe position and then back to inwipe position.

DETAILED DESCRIPTION OF THE PREFERRED EMBODIMENTS

Figure 3:
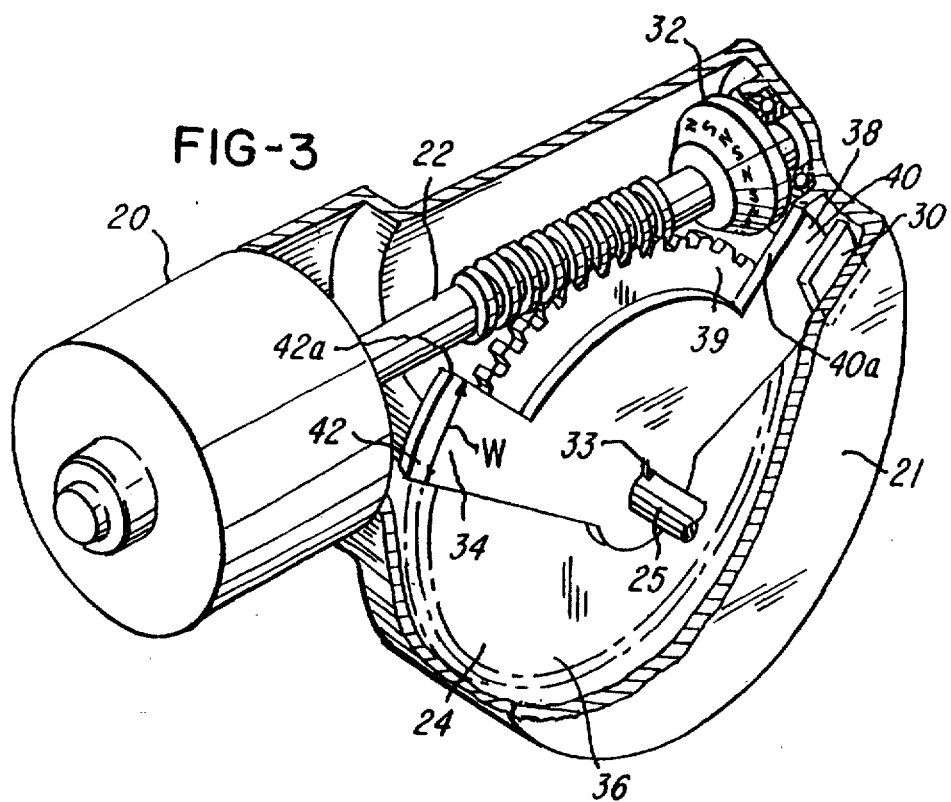
FIG. 3 is a fragmentary view of the wiper motor system showing further details of the invention.

Referring now to FIG. 1, a windshield wiper system 10 is shown comprising at least one windshield wiper blade 12 for wiping a windshield 14 from an inwipe position IW to an outwipe position OW in order to clean a surface 14A of the windshield 14.

The wiper system 10 also comprises a switch 17 for enabling an operator to initiate the windshield wiper system 10 through a wiper motor controller 26.

The windshield wiper system 10 comprises reversing electric wiper motor 20 having an armature 22 (FIG. 2A) which is coupled to a drive train 24 as shown. The drive train 24 comprises a shaft 25 which couples the wiper motor 20 directly to an arm 13 (FIG. 1) which, in turn, is coupled to wiper blade 12.

For ease of illustration, the features of the invention will be described relative to a single wiper blade 12 and wiper motor 20, but it should be appreciated that each wiper blade 12 has a wiper motor 20 coupled directly thereto and utilizes the features of this invention.

The controller 26 is coupled to the wiper motor 20 for controlling the operation of the wiper motor 20 in response to a drive signal 28 (FIG. 4). The system 10 further comprises a sensor 30 (FIGS. 2A and 3) which are coupled to controller 26 and which is mounted to a housing wall 21 (FIG. 3) of wiper motor 20. In the embodiment being described, the sensor 30 is mounted in operative relationship with armature 22 and cooperates with a target 32 which comprises at least one multi-pole magnet mounted directly to or is integral with armature 22. It should be appreciated that, as the armature 22 is rotatably driven by wiper motor 20, the sensor 30 cooperates with target 32 to generate a stream of stepped pulses represented by position signal 29 illustrated in FIG. 4.

The system 10 further comprises an interrupter 34 which interrupts the sensor 30 at predetermined or desired times generally corresponding to when the wiper blade 12 reaches either the inwipe position IW (FIG. 1) or outwipe position OW. As will be described later herein, sensor 30 generates the interrupted position signal 29 which is received by controller 26 which responds by energizing wiper motor 20 with the opposite polarities of drive signal 28 to cause armature 22 to reverse directions, thereby causing wiper blade 12 to move between inwipe and outwipe positions IW and OW, respectively.

In the embodiment being described, the sensor 30 may comprise a Hall effect sensor, such as Hall effect sensor model no. 3189 manufactured by Allegro Microsystems, Inc. of Worcester, Mass.

As best illustrated in FIG. 3, the target 32 is mounted directly to armature 22 and sensor 30 is situated on housing wall 21 in fixed relationship relative thereto. In the embodiment being described, the drive train 24 comprises at least one driven gear 36 which is driven by armature 22 and which has the interrupt 34 mounted directly thereto (for example, by using a key 33). In the embodiment being described, the interrupt 34 comprises a planer plate 38 comprising a notched-out area 39 which defines an inwipe interrupt 40 and an outwipe interrupt 42. It should be appreciated that the width W (FIG. 3) of the interrupts 40 and 42 generally correspond to the width WI (FIG. 1) of the inwipe and outwipe areas IW and OW. The operation and function of the interrupts 40 and 42 will be described later herein.

In general, as the armature 22 of wiper motor 20 drives driven gear 36 of drive train 24, the inwipe and outwipe interrupts 40 and 42 oscillate or toggle to periodically interrupt sensor 30, thereby indicating that the wiper blade 12 has entered into either the inwipe or outwipe areas IW and OW (FIG. 1), respectively.

The controller 26 comprises a counter 44 (FIG. 1) for counting pulses being generated by the sensor 30. Controller 26 energizes wiper motor 20 with the drive signal 28 to continuously drive driven gear 36 initially from a park position PP (FIGS. 1, 4 and 5), where the wiper blade 12 is parked, past the inwipe interrupt 40. As best illustrated in FIG. 4, the position signal is generated by sensor 30 and corresponds to the movement of wiper blade 12. As illustrated in FIG. 4, after motor 20 drives wiper blade 12 from the park position PP past the inwipe position IW, wiper motor 20 drives wiper blade 12 from the inwipe position IW toward the outwipe position, where it encounters edge 42A (FIG. 3) of outwipe interrupt OW. The outwipe interrupt 42 moves between sensor 30 and target 32, thereby interrupting the sensor 30 (point 29A of position signal 29).

At point 29A (FIG. 4), and after a predetermined period of time, controller 26 responds to this interruption by changing the polarity of drive signal 44 from a high or positive polarity of +12 volts, for example, to a low or negative polarity of −12 volts as outwipe interrupt 42 is driven past sensor 30 midway through the outwipe interrupt 40A.

The low drive signal 44 is then received by wiper motor 20 which reverses direction, thereby causing blade 12 to reverse directions and move from the outwipe position OW to the inwipe position IW until sensor 30 encounters an edge 40A of the inwipe interrupt 40 at point 29B. At this point, the controller 26 again changes the polarity of the drive signal 28 about midway through the inwipe interrupt 40 from a low to a high to cause wiper motor 20 to again reverse directions.

It should be appreciated, that the controller 26 may modulate or alter the amplitude and/or pulse width of drive signal 28, for example, to cause drive motor 20 to slow down before reversing directions, when the wiper blade 12 enters into either the inwipe area IW or outwipe area OW.

A cycle of operation will now be described in more detail relative to FIGS. 4 and 5. FIGS. 4 and 5 further illustrate the correspondence among the drive signal 44, sensor signal 29 and the position of wiper blade 12. Initially, the wiper blade 12 is in the park position PP. Upon actuation of wiper switch 17 (FIG. 1) by an operator, controller 26 generates high drive signal 28 to energize wiper motor 20 to drive driven gear 36 and wiper blade from the park position PP, past the inwipe interrupt 40, and towards the outwipe position OW. As long as the controller 26 is generating the high signal 28, the wiper blade 12 is being driven towards the outwipe position OW. This enables controller 26 to determine the direction in which the wiper blade 12 is moving.

As wiper motor 20 drives driven gear 36, outwipe interrupt 42 is driven between sensor 30 and target 32, thereby interrupting the sensor signal 29 pulse train at point 29A (FIG. 4) as mentioned above. At this point 29A, edge 40A (FIG. 3) is encountered by sensor 30. Controller 26 monitors the sensor signal 29 and may cause wiper motor 20 to reverse directions immediately. Alternatively, controller 26 may continue to drive wiper motor 20 for a predetermined period of time, as mentioned earlier, corresponds to about the midway point of outwipe interrupt 42.

After the predetermined period of time, controller 26 reverses the polarity of the drive signal from, for example, +12 volts to −12 volts, thereby causing wiper motor 20 to again reverse directions. As illustrated in FIGS. 4 and 5, when the drive signal 28 goes low, the wiper motor 20 reverses direction and begins driving wiper blade 12 from the outwipe position OW to the inwipe position IW until inwipe interrupt 42 is again driven between sensor 30 and target 32 to interrupt sensor 30 at point 29B (FIG. 4), thereby indicating that wiper blade 12 has reached the outwipe position OW. Again, controller 26 may continue to energize wiper motor 20 with a modulated pulse width or amplitude of drive signal 28 for a predetermined period of time to enable the wiper motor 20 to slow down before reversing directions.

After such predetermined period of time, controller 26 again reverses polarity of drive signal 28 to cause wiper motor 20 to reverse directions such that the wiper blade 12 is again driven from the inwipe position (IW) to the outwipe position (OW) in the manner described above.

When the operator actuates the wiper switch 17 to an off position, controller 26 receives the off signal, and during the current or next cycle where the drive signal 28 is low (which indicates that wiper blade 12 is moving towards the inwipe position IW), controller 26 continues to generate a low drive signal 28. This cause the wiper blade 12 to be driven past the inwipe position IW for a predetermined period of time until wiper blade 12 is driven to the park position PP where controller 26 terminates the drive signal 28, thereby causing wiper blade 12 to be parked in the park position PP.

Advantageously, controller 26 monitors the pulse train of sensor signal 29 and by determining the number of pulses expired between inwipe and outwipe positions IW and OW, respectively, along with the polarity of the drive signal 44, controller 26 can determine precisely where wiper blade 12 is in its cycle, as well as the direction in which wiper blade 12 is moving (i.e., from IW to OW or OW to IW).

Also, it should be appreciated that using a single sensor 30 in cooperation with a single target 32, pulses are generated at constant intervals which can be corrected directly with wiper blade 12 travel distance information. Controller 26 comprises a clock (not shown) which is capable of providing real time information which, when used in conjunction with the distance information provided by sensor 30, enable controller 26 to calculate a velocity of wiper blade 12.

The inwipe and outwipe interrupts 40 and 42 when used with the sensor 30 also enable controller 26 to determine when it is time to reverse the direction of wiper blade 12. Although not shown, controller 26 can confirm this reversing direction by counting the pulses it takes to reach a reversal point (i.e., either the inwipe position IW or outwipe position OW).

This should be appreciated that wiper blade 12 velocity, position, and direction can be determined using a single sensor 30 when used in combination with the interrupt 34 and target 32. This, in turn, facilitates controlling the operation and movement of multiple wiper blades 12 so that the do not collide during operation.

While the forms herein described, and the forms of apparatus for carrying these methods into effect, constitute preferred embodiments of this invention, it is to be understood that the invention is not limited to these precise methods and forms apparatus, and that changes may be made in either without departing from the scope of the invention, which is defined in the appended claims.

What is claimed is:

1. A windshield wiper system comprising:
   a controller;
   at least one windshield wiper blade;
   a reversing wiper motor coupled to said controller, said reversing wiper motor having an armature;
   a drive train for coupling said reversing wiper motor to said at least one windshield wiper blade;
   a sensor coupled to the armature for use by said controller for generating a position signal indicating a wiper blade direction and a wiper blade position;
   wherein said armature comprises a target and said sensor is situated in a fixed relationship relative to said target;
   said drive train comprising at least one driven gear driven by said armature, the drive train comprising an interrupt mounted thereon for interrupting said sensor when said at least one wiper blade reaches either an inwipe position or an outwipe position, said controller causing said motor to reverse directions in response to said interrupting said sensor.

2. The windshield wiper system as recited in claim 1 wherein said wiper blade position comprises an inwipe position and an endwipe position, said system further comprising an interrupt coupled to said drive train for cooperating with said sensor to generate said position signal at said inwipe position and said endwipe position.

3. The windshield wiper system as recited in claim 1 wherein said sensor comprises a Hall effect sensor.

4. The windshield wiper system as recited in claim 1 wherein said sensor generates a plurality of pulses at constant angle intervals, said controller being capable of determining a wiper blade speed and a position of said at least one wiper blade between said inwipe and outwipe positions in response to said plurality of pulses.

5. The windshield wiper system as recited in claim 4 wherein said sensor is a Hall effect sensor.

6. A windshield wiper system comprising:
   a controller;
   at least one windshield wiper blade;
   a reversing wiper motor coupled to said controller, said reversing wiper motor having an armature;
   a drive train for coupling said reversing wiper motor to said at least one windshield wiper blade;
   a sensor coupled to the armature for use by said controller for generating a position signal indicating a wiper blade direction and a wiper blade position;
   wherein said drive train comprises a driven gear comprising an interrupt for interrupting said sensor;
   said armature comprising a target for cooperating with said sensor to generate a plurality of pulses at constant angle intervals of said armature;
   said interrupt comprising an interrupt plate comprising an inwipe interrupt area and an outwipe interrupt area corresponding to an inwipe position and an outwipe position, respectively.

7. The windshield wiper system as recited in claim 6 wherein said target comprises a multi-pole magnet.

8. A windshield wiper system comprising:
   a controller;
   at least one windshield wiper blade;
   a reversing wiper motor coupled to said controller, said reversing wiser motor having an armature;
   a drive train for coupling said reversing wiper motor to said at least one windshield wiper blade;
   a sensor coupled to the armature for use by said controller for generating a position signal indicating a wiper blade direction and a wiper blade position;
   wherein said drive train comprises a driven gear comprising an interrupt for interrupting said sensor;
   said armature comprising a target for cooperating with said sensor to generate a plurality of pulses at constant angle intervals of said armature;
   said interrupt comprising an interrupt plate comprising an inwipe interrupt area and an outwipe interrupt area corresponding to an inwipe position and an outwipe position, respectively.

\* \* \* \* \*

UNITED STATES PATENT AND TRADEMARK OFFICE
CERTIFICATE OF CORRECTION

PATENT NO. : 5,860,185
DATED : January 19, 1999
INVENTOR(S) : Ponziani

It is certified that error appears in the above-identified patent and that said Letters Patent is hereby corrected as shown below:

<u>Drawings,</u>
Figure 3, please insert -- 36 -- in accordance with the drawing attached.

Signed and Sealed this

Fifth Day of March, 2002

Attest:

JAMES E. ROGAN
*Attesting Officer*     *Director of the United States Patent and Trademark Office*